2,654,076

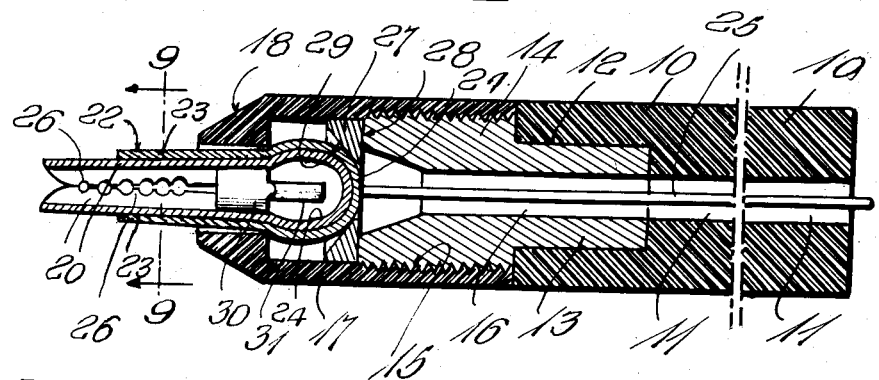
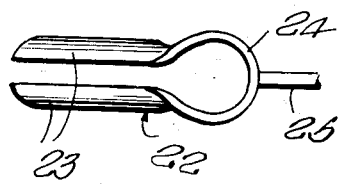
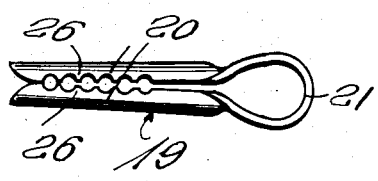
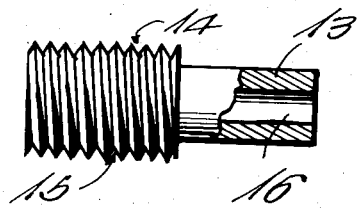
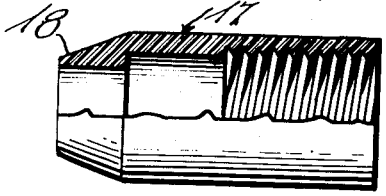
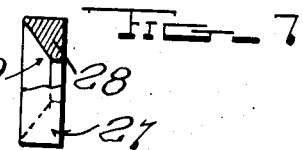
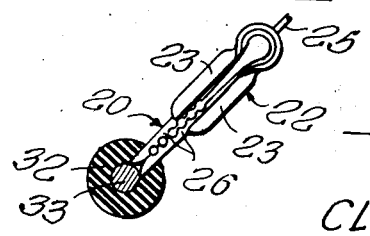
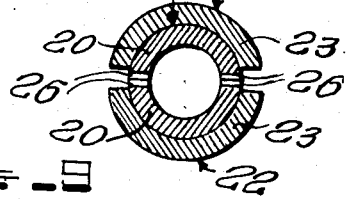
INVENTOR
CLAIR W. HUDLOW,
BY
ATTORNEY Patented Sept. 29, 1953

UNITED STATES PATENT OFFICE 2,654,076

ELECTRICAL TESTING INSTRUMENT HAVING INSULATION PIERCING AND WIRE GRIPPING MEANS

Clair W. Hudlow, Washington, D. C.; Matthew J. O'Callaghan, Jr., administrator of said Clair W. Hudlow, deceased, assignor of one-third to Eleanor Dorr, Washington, D. C., one-third to Ruth Wallace, Greenbelt, and one-third to Lucille Stumpf, Takoma Park, Md.

Application February 9, 1951, Serial No. 210,122

4 Claims. (Cl. 339—108)

The present invention relates to an electrical testing instrument and it consists in the combinations, constructions and arrangements of parts herein described and claimed.

Generally there is provided an elongated cylindrical handle of dielectric material having a centrally and longitudinally disposed channel therein. In the outer end of the handle there is frictionally engaged the inner end of a hollow metallic cylinder whose outer portion is exteriorly threaded for engagement with an interiorly threaded extension member of dielectric material. The extension piece is inwardly tapered at its outer end and is provided with a centrally disposed passageway and a hollow interior. In the hollow interior of the extension piece there is provided a cylindrical abutment which has a flat inner surface which bears against the outer end of the metallic cylindrical member and which is provided with a frustro-conically shaped recess in its outer face. A substantially U-shaped testing member is provided with a pair of substantially parallel leg members which extend outwardly through the opening in extension device and with a rounded bight portion. A reinforcing member for the testing member encompasses a portion of each of the legs of the testing member and is also provided with a rounded bight portion which is closely aligned with the bight portion of the testing member and the bight portion of the reinforcing member is positioned within the frustro-conically shaped recess whereby outward pressure upon the abutment will cause the legs of the reinforcing member and consequently the legs of the testing member to be forced together. The legs of the testing member are each substantially semicircular in cross sectional area as are the legs of the encompassing reinforcing member and the outer portions of the legs of the testing member are each serrated. An aligning member is positioned between the inner faces of the inward portion of the legs of the testing member and is provided with an enlarged head which lies within the hollow portion of the extension piece to maintain the same against accidental loss. A lead wire extends through the handle, the metallic cylindrical member and the abutment and is soldered to the bight portion of the reinforcing member. The device is so constructed that it may be used in conventional manner or again either of the legs, which are pointed, of the testing member may be utilized to penetrate through ordinary insulation to make contact with the wire embedded therein and, finally, the legs may be forced over opposite sides of a wire whereupon the serrations will assist in maintaining the device in gripping contact with such wire without any extraneous manipulation of the device.

It is accordingly an object of the invention to provide a device of the character set forth which is simple in construction, inexpensive to manufacture and yet effective and efficient in use.

Another object of the invention is the provision of a novel and compact electrical testing implement.

A further object of the invention is the provision, in a device of the character set forth, of novel gripping legs forming a part of the invention.

A further object of the invention is the provision of novel means, in a device of the character set forth, for maintaining a pair of testing legs in normally inwardly biased condition.

Other and further objects of the invention will become apparent from a reading of the following specification taken in conjunction with the drawing, in which:

Figure 1 is a vertical longitudinal sectional view of an embodiment of the invention, Figure 2 is an elevational view of a reinforcing member forming a part of the invention, Figure 3 is an elevational view of a testing member forming a part of the invention, Figure 4 is a perspective view of an aligning member forming a part of the invention, Figure 5 is an elevational view of a metallic cylindrical connecting member forming a part of the invention, Figure 6 is an enlarged elevational view of an extension piece forming a part of the invention, Figure 7 is an elevational view of an abutment or actuating collar forming a part of the invention, Figure 8 is an enlarged fragmentary elevational view, partly in section, illustrating one manner of utilizing the invention, and Figure 9 is an enlarged sectional view taken along line 9—9 of Figure 1.

Referring more particularly to the drawing, there is shown therein an elongated cylindrical handle 10 of dielectric material having a centrally disposed channel 11 therein. The outer end of the handle 10 is provided with a cylindrical recess 12 for the frictional reception therein of the inner portion 13 of a metallic cylindrical member generally indicated at 14, and whose outer portion is exteriorly threaded, as indicated at 15.

The member 14 is provided with a centrally disposed longitudinally extending channel 16 which is adapted to communicate with the channel 11 in the handle 10.

An extension piece 17 of the same outer diameter as the handle 10 is interiorly threaded for the reception of the threads 15 on the connecting member 14. The member 17 is of dielectric material and is preferably formed with an inwardly tapering outer end 18. The member 17 is provided with a hollow interior and with a centrally disposed opening in its forward end which communicates with the interior.

A substantially U-shaped testing member is generally indicated at 19 and is provided with a pair of substantially parallel legs 20 and a rounded bight portion 21. Each of the legs 20 is substantially semi-circular in cross sectional area and arranged in such manner that the hollow faces of such legs are presented to each other.

A reinforcing member is generally indicated at 22 and is likewise substantially U-shaped and provided with a pair of legs 23 which are substantially shorter than the legs 20 and likewise substantially semi-circular in cross sectional area and arranged to encompass the rearward portions of the legs 20. The member 22 is likewise provided with a rounded bight portion 24 which encompasses in close alignment the bight portion 21 of the member 19. A lead wire is centrally affixed to the bight portion 24, as indicated at 25 and extends inwardly through the channels 16 and 11. The abutting edges of the legs 20 are each provided with serrations 26.

Within the interior of the extension piece 17 and abutting the outer end of the connecting member 14 is a cylindrical actuating member 27 having a flattened rear face 28 and provided with a frustro-conically shaped recess 29 in its forward face.

A cylindrical aligning member 30 lies between the inner portions of the legs 20 and has integrally formed therewith an enlarged head 31 which is adapted to remain in the interior of the extension member 17 and within the bight portions 21 and 24 of the members 19 and 22, respectively.

In operation, it will be apparent that the entire device may be manipulated as a unit by grasping the handle 10 in conventional manner and that the legs 20 may be utilized for testing purposes in the conventional manner by merely touching the same to wires and the like to be tested. It will also be seen that the bight portion 24 of the member 22 will abut the sides of the recess 29 at its outer portions and that when the member 14 is screwed into the extension piece 17 that it will abut against the flat face 28 of the member 27 thereby forcing the legs 23 of the member 22 toward each other and thus, in turn, forcing the legs 20 toward each other. Thus it will be apparent that the legs 20 will at all times be biased toward each other and that hence when it is desired to contact and grip a wire to be tested, it is only necessary to force the wire between the pointed outer ends of the legs 20 whereupon the serrations 26 will act in conjunction with the inward pressure applied to the legs 20 by the member 27 to securely grip such wire and maintain the entire device in such gripping contact without the need for any extraneous devices.

It will also be apparent that in order to keep the serrations 26 on the legs 20 in proper coacting relationship, the cylindrical member 30 will prevent the sides of the legs 20 from getting out of alignment since the inner concave faces of the legs 20 will be in secure engagement with the member 30. The enlarged head portion 31 acts to retain the member 30 at all times in its proper position at the inner portions of the legs 20 and further acts to prevent loss of the same outwardly between the legs 20 which might otherwise occur if the head 31 were not provided.

Another feature of the invention is the pointed outer ends of the legs 20 which allow the device to penetrate through, for example, insulation 32 to contact a wire 33 embedded therein, as illustrated, for example, in Figure 8 of the drawing.

While but one form of the invention has been shown and described herein, it will be readily apparent to those skilled in the art that many minor modifications may be made without departing from the spirit of the invention or the scope of the appended claims.

What is claimed is:

1. A device of the character described comprising an elongated cylindrical handle of dielectric material having a centrally disposed longitudinal channel therethrough and having a recess in its outer end, a hollow cylindrical extension piece of dielectric material of identical outer diameter with said handle, a metallic hollow cylindrical connector threaded into said extension piece at the outer portion of the connector and said connector having its inner portion frictionally receivable in the recess in said handle, a U-shaped testing member having a pair of substantially parallel legs extending outwardly of said extension piece, said legs of the testing member each being semi-circular in cross sectional area and having their concave faces presented toward each other, a lead wire extending through the channel in said handle and through said connector and having electrical connection with said testing member, means for biasing said legs of said testing member toward each other, and means for maintaining said legs of said testing member in longitudinal alignment, said last-mentioned means comprising a cylindrical body positioned between the inner portions of said testing member legs, and an enlarged head formed integrally with said body and positioned within the bight portion of said testing member.

2. A device of the character described comprising an elongated cylindrical handle of dielectric material having a centrally disposed longitudinal channel therethrough and having a recess in its outer end, a hollow cylindrical extension piece of dielectric material of identical outer diameter with said handle, a metallic hollow cylindrical connector threaded into said extension piece at the outer portion of the connector and said connector having its inner portion frictionally receivable in the recess in said handle, a U-shaped testing member having a pair of substantially parallel legs extending outwardly of said extension piece, said legs of the testing member each being semi-circular in cross sectional area and having their concave faces presented toward each other, a lead wire extending through the channel in said handle and through said connector and having electrical connection with said testing member, means for biasing said legs of said testing member toward each other, said means including a reinforcing member having a pair of legs likewise semi-circular in cross sectional area and shorter than the legs of the testing member, and a bight portion of similar shape to the bight portion of the testing member, said reinforcing member encompassing said testing member in close relationship, and a cylindrical actuating member having a flat inner face abutting the outer end of the connector and having a frustro-conically shaped recess in its outer face for receiving therein the bight portion of said reinforcing member.

3. A device of the character described comprising an elongated cylindrical handle of dielectric material having a centrally disposed longitudinal channel therethrough and having a recess in its outer end, a hollow cylindrical extension piece of dielectric material of identical outer diameter with said handle, a metallic hollow cylindrical connector threaded into said extension piece at the outer portion of the connector and said connector having its inner portion frictionally receivable in the recess in said handle, a U-shaped testing member having a pair of substantially parallel legs extending outwardly of said extension piece, said legs of the testing member each being semi-circular in cross sectional area and having their concave faces presented toward each other, a lead wire extending through the channel in said handle and through said connector and having electrical connection with said testing member, means for biasing said legs of said testing member toward each other, said means including a reinforcing member having a pair of legs likewise semi-circular in cross sectional area and shorter than the legs of the testing member, and a bight portion of similar shape to the bight portion of the testing member, said reinforcing member encompassing said testing member in close relationship, a cylindrical actuating member having a flat inner face abutting the outer end of the connector and having a frustro-conically shaped recess in its outer face for receiving therein the bight portion of said reinforcing member, and means for maintaining said legs of said testing member in longitudinal alignment.

4. A device of the character described comprising an elongated cylindrical handle of dielectric material having a centrally disposed longitudinal channel therethrough and having a recess in its outer end, a hollow cylindrical extension piece of dielectric material of identical outer diameter with said handle, a metallic hollow cylindrical connector threaded into said extension piece at the outer portion of the connector and said connector having its inner portion frictionally receivable in the recess in said handle, a U-shaped testing member having a pair of substantially parallel legs extending outwardly of said extension piece, said legs of the testing member each being semi-circular in cross sectional area and having their concave faces presented toward each other, a lead wire extending through the channel in said handle and through said connector and having electrical connection with said testing member, means for biasing said legs of said testing member toward each other, said means including a reinforcing member having a pair of legs likewise semi-circular in cross sectional area and shorter than the legs of the testing member, and a bight portion of similar shape to the bight portion of the testing member, said reinforcing member encompassing said testing member in close relationship, a cylindrical actuating member having a flat inner face abutting the outer end of the connector and having a frustro-conically shaped recess in its outer face for receiving therein the bight portion of said reinforcing member, and means for maintaining said legs of said testing member in longitudinal alignment, said last-mentioned means comprising a cylindrical body positioned between the inner portions of said testing member legs, and an enlarged head formed integrally with said body and positioned within the bight portion of said testing member.

CLAIR W. HUDLOW.

References Cited in the file of this patent

UNITED STATES PATENTS

| Number | Name | Date |
|---|---|---|
| 2,134,074 | Chirelstein | Oct. 25, 1938 |
| 2,518,489 | Orlando | Aug. 15, 1950 |

FOREIGN PATENTS

| Number | Country | Date |
|---|---|---|
| 248,614 | Switzerland | Feb. 16, 1948 |
| 558,046 | France | May 16, 1923 |
| 646,578 | France | July 16, 1928 |